(12) United States Patent
Uhlig et al.

(10) Patent No.: US 7,073,042 B2
(45) Date of Patent: Jul. 4, 2006

(54) RECLAIMING EXISTING FIELDS IN ADDRESS TRANSLATION DATA STRUCTURES TO EXTEND CONTROL OVER MEMORY ACCESSES

(75) Inventors: Richard Uhlig, Hillsboro, OR (US); Gilbert Neiger, Portland, OR (US); Erik Cota-Robles, Portland, OR (US); Stalinselvaraj Jeyasingh, Portland, OR (US); Alain Kagi, Portland, OR (US); Michael Kozuch, Export, PA (US); Steven M Bennett, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 189 days.

(21) Appl. No.: 10/319,900

(22) Filed: Dec. 12, 2002

(65) Prior Publication Data

US 2004/0117593 A1 Jun. 17, 2004

(51) Int. Cl.
*G06F 12/10* (2006.01)
(52) U.S. Cl. ............... 711/207; 711/163; 711/203
(58) Field of Classification Search ........... 711/203, 711/205–209
See application file for complete search history.

(56) References Cited

U.S. PATENT DOCUMENTS

| 3,699,532 | A | 10/1972 | Schaffer et al. |
| 3,996,449 | A | 12/1976 | Attanasio et al. |
| 4,037,214 | A | 7/1977 | Birney et al. |
| 4,162,536 | A | 7/1979 | Morley |
| 4,207,609 | A | 6/1980 | Luiz et al. |
| 4,247,905 | A | 1/1981 | Yoshida et al. |
| 4,276,594 | A | 6/1981 | Morley |
| 4,278,837 | A | 7/1981 | Best |
| 4,307,447 | A | 12/1981 | Provanzano et al. |
| 4,319,233 | A | 3/1982 | Matsuoka et al. |
| 4,319,323 | A | 3/1982 | Ermolovich et al. |
| 4,347,565 | A | 8/1982 | Kaneda et al. |
| 4,366,537 | A | 12/1982 | Heller et al. |
| 4,403,283 | A | 9/1983 | Myntti et al. |
| 4,419,724 | A | 12/1983 | Branigin et al. |
| 4,430,709 | A | 2/1984 | Schleupen et al. |
| 4,521,852 | A | 6/1985 | Guttag |
| 4,571,672 | A | 2/1986 | Hatada et al. |
| 4,621,318 | A | 11/1986 | Maeda |

(Continued)

FOREIGN PATENT DOCUMENTS

DE 42177444 A1 12/1992

(Continued)

OTHER PUBLICATIONS

Judith S. Hall et al, "Virtualizing the VAX Architecture", ACM SIGARCH Computer Architecture News, vol. 19, No. 3, May 1991, pp. 380-389.*

(Continued)

*Primary Examiner*—Pierre M. Vital
(74) *Attorney, Agent, or Firm*—Blakely, Sokoloff, Taylor & Zafman LLP

(57) ABSTRACT

In one embodiment, when it is determined that a modification of content of an active address translation data structure is required, an entry in the active address translation data structure is modified to conform to a corresponding entry in a guest address translation data structure. During the modification, a bit field including one or more access control indicators in the entry of the active address translation data structure is not overwritten with corresponding data from the guest address translation data structure.

30 Claims, 5 Drawing Sheets

U.S. PATENT DOCUMENTS

| | | |
|---|---|---|
| 4,759,064 A | 7/1988 | Chaum |
| 4,795,893 A | 1/1989 | Ugon |
| 4,802,084 A | 1/1989 | Ikegaya et al. |
| 4,825,052 A | 4/1989 | Chemin et al. |
| 4,907,270 A | 3/1990 | Hazard |
| 4,907,272 A | 3/1990 | Hazard |
| 4,910,774 A | 3/1990 | Barakat |
| 4,975,836 A | 12/1990 | Hirosawa et al. |
| 5,007,082 A | 4/1991 | Cummins |
| 5,022,077 A | 6/1991 | Bealkowski et al. |
| 5,075,842 A | 12/1991 | Lai |
| 5,079,737 A | 1/1992 | Hackbarth |
| 5,187,802 A | 2/1993 | Inoue et al. |
| 5,230,069 A | 7/1993 | Brelsford et al. |
| 5,237,616 A | 8/1993 | Abraham et al. |
| 5,255,379 A | 10/1993 | Melo |
| 5,287,363 A | 2/1994 | Wolf et al. |
| 5,293,424 A | 3/1994 | Hotley et al. |
| 5,295,251 A | 3/1994 | Wakui et al. |
| 5,317,705 A | 5/1994 | Gannon et al. |
| 5,319,760 A | 6/1994 | Mason et al. |
| 5,361,375 A | 11/1994 | Ogi |
| 5,386,552 A | 1/1995 | Garney |
| 5,421,006 A | 5/1995 | Jablon et al. |
| 5,434,999 A | 7/1995 | Goire et al. |
| 5,437,033 A | 7/1995 | Inoue et al. |
| 5,442,645 A | 8/1995 | Ugon et al. |
| 5,455,909 A | 10/1995 | Blomgren et al. |
| 5,459,867 A | 10/1995 | Adams et al. |
| 5,459,869 A | 10/1995 | Spilo |
| 5,469,557 A | 11/1995 | Salt et al. |
| 5,473,692 A | 12/1995 | Davis |
| 5,479,509 A | 12/1995 | Ugon |
| 5,504,922 A | 4/1996 | Seki et al. |
| 5,506,975 A | 4/1996 | Onodera |
| 5,511,217 A | 4/1996 | Nakajima et al. |
| 5,522,075 A * | 5/1996 | Robinson et al. ........... 718/100 |
| 5,528,231 A | 6/1996 | Patarin |
| 5,533,126 A | 7/1996 | Hazard et al. |
| 5,555,385 A | 9/1996 | Osisek |
| 5,555,414 A | 9/1996 | Hough et al. |
| 5,560,013 A | 9/1996 | Scalzi et al. |
| 5,564,040 A | 10/1996 | Kubals |
| 5,566,323 A | 10/1996 | Ugon |
| 5,568,552 A | 10/1996 | Davis |
| 5,574,936 A | 11/1996 | Ryba et al. |
| 5,582,717 A | 12/1996 | Di Santo |
| 5,604,805 A | 2/1997 | Brands |
| 5,606,617 A | 2/1997 | Brands |
| 5,615,263 A | 3/1997 | Takahashi |
| 5,628,022 A | 5/1997 | Ueno et al. |
| 5,633,929 A | 5/1997 | Kaliski, Jr. |
| 5,657,445 A | 8/1997 | Pearce |
| 5,668,971 A | 9/1997 | Neufeld |
| 5,684,948 A | 11/1997 | Johnson et al. |
| 5,706,469 A | 1/1998 | Kobayashi |
| 5,717,903 A | 2/1998 | Bonola |
| 5,720,609 A | 2/1998 | Pfefferle |
| 5,721,222 A | 2/1998 | Bernstein et al. |
| 5,729,760 A | 3/1998 | Poisner |
| 5,737,604 A | 4/1998 | Miller et al. |
| 5,737,760 A | 4/1998 | Grimmer, Jr. et al. |
| 5,740,178 A | 4/1998 | Jacks et al. |
| 5,752,046 A | 5/1998 | Oprescu et al. |
| 5,757,604 A | 5/1998 | Bennett et al. |
| 5,757,919 A | 5/1998 | Herbert et al. |
| 5,764,969 A | 6/1998 | Kahle et al. |
| 5,796,835 A | 8/1998 | Saada |
| 5,796,845 A | 8/1998 | Serikawa et al. |
| 5,805,712 A | 9/1998 | Davis |
| 5,809,546 A | 9/1998 | Greenstein et al. |
| 5,825,875 A | 10/1998 | Ugon |
| 5,825,880 A | 10/1998 | Sudia et al. |
| 5,835,594 A | 11/1998 | Albrecht et al. |
| 5,844,986 A | 12/1998 | Davis |
| 5,852,717 A | 12/1998 | Bhide et al. |
| 5,854,913 A | 12/1998 | Goetz et al. |
| 5,867,577 A | 2/1999 | Patarin |
| 5,872,994 A | 2/1999 | Akiyama et al. |
| 5,890,189 A | 3/1999 | Nozue et al. |
| 5,900,606 A | 5/1999 | Rigal |
| 5,901,225 A | 5/1999 | Ireton et al. |
| 5,903,752 A | 5/1999 | Dingwall et al. |
| 5,919,257 A | 7/1999 | Trostle |
| 5,935,242 A | 8/1999 | Madany et al. |
| 5,935,247 A | 8/1999 | Pai et al. |
| 5,937,063 A | 8/1999 | Davis |
| 5,944,821 A | 8/1999 | Angelo |
| 5,953,502 A | 9/1999 | Helbig, Sr. |
| 5,956,408 A | 9/1999 | Arnold |
| 5,970,147 A | 10/1999 | Davis et al. |
| 5,978,475 A | 11/1999 | Schneier et al. |
| 5,978,481 A | 11/1999 | Ganesan et al. |
| 5,987,557 A | 11/1999 | Ebrahim |
| 6,014,745 A | 1/2000 | Ashe |
| 6,035,374 A | 3/2000 | Panwar et al. |
| 6,044,478 A | 3/2000 | Green |
| 6,055,637 A | 4/2000 | Hudson et al. |
| 6,058,478 A | 5/2000 | Davis |
| 6,061,794 A | 5/2000 | Angelo |
| 6,075,938 A | 6/2000 | Bugnion et al. |
| 6,085,296 A | 7/2000 | Karkhanis |
| 6,088,262 A | 7/2000 | Nasu |
| 6,092,095 A | 7/2000 | Maytal |
| 6,093,213 A | 7/2000 | Favor et al. |
| 6,101,584 A | 8/2000 | Satou et al. |
| 6,108,644 A | 8/2000 | Goldschlag et al. |
| 6,115,816 A | 9/2000 | Davis |
| 6,125,430 A | 9/2000 | Noel et al. |
| 6,131,166 A | 10/2000 | Wong-Isley |
| 6,148,379 A | 11/2000 | Schimmel |
| 6,158,546 A | 12/2000 | Hanson et al. |
| 6,173,417 B1 | 1/2001 | Merrill |
| 6,175,924 B1 | 1/2001 | Arnold |
| 6,175,925 B1 | 1/2001 | Nardone et al. |
| 6,178,509 B1 | 1/2001 | Nardone et al. |
| 6,182,089 B1 | 1/2001 | Ganapathy et al. |
| 6,188,257 B1 | 2/2001 | Buer |
| 6,192,455 B1 | 2/2001 | Bogin et al. |
| 6,199,152 B1 | 3/2001 | Kelly et al. |
| 6,205,550 B1 | 3/2001 | Nardone et al. |
| 6,212,635 B1 | 4/2001 | Reardon |
| 6,222,923 B1 | 4/2001 | Schwenk |
| 6,249,872 B1 | 6/2001 | Wildgrube et al. |
| 6,252,650 B1 | 6/2001 | Nakaumra |
| 6,269,392 B1 | 7/2001 | Cotichini et al. |
| 6,272,533 B1 | 8/2001 | Browne |
| 6,272,637 B1 | 8/2001 | Little et al. |
| 6,275,933 B1 | 8/2001 | Fine et al. |
| 6,282,650 B1 | 8/2001 | Davis |
| 6,282,651 B1 | 8/2001 | Ashe et al. |
| 6,282,657 B1 | 8/2001 | Kaplan et al. |
| 6,292,874 B1 | 9/2001 | Barnett |
| 6,301,646 B1 | 10/2001 | Hostetter et al. |
| 6,308,270 B1 | 10/2001 | Guthery et al. |
| 6,314,409 B2 | 11/2001 | Schneck et al. |
| 6,321,314 B1 | 11/2001 | Van Dyke |
| 6,327,652 B1 | 12/2001 | England et al. |
| 6,330,670 B1 | 12/2001 | England et al. |
| 6,339,815 B1 | 1/2002 | Feng et al. |
| 6,339,816 B1 | 1/2002 | Bausch |
| 6,357,004 B1 | 3/2002 | Davis |
| 6,363,485 B1 | 3/2002 | Adams |
| 6,374,286 B1 | 4/2002 | Gee et al. |

| | | |
|---|---|---|
| 6,374,317 B1 | 4/2002 | Ajanovic et al. |
| 6,378,068 B1 | 4/2002 | Foster |
| 6,378,072 B1 | 4/2002 | Collins et al. |
| 6,389,537 B1 | 5/2002 | Davis et al. |
| 6,397,242 B1 | 5/2002 | Devine et al. |
| 6,397,379 B1 | 5/2002 | Yates, Jr. et al. |
| 6,412,035 B1 | 6/2002 | Webber |
| 6,421,702 B1 | 7/2002 | Gulick |
| 6,435,416 B1 | 8/2002 | Slassi |
| 6,445,797 B1 | 9/2002 | McGough et al. |
| 6,463,535 B1 | 10/2002 | Drews et al. |
| 6,463,537 B1 | 10/2002 | Tello |
| 6,499,123 B1 | 12/2002 | McFarland et al. |
| 6,505,279 B1 | 1/2003 | Phillips et al. |
| 6,507,904 B1 | 1/2003 | Ellison et al. |
| 6,529,909 B1 | 3/2003 | Bowman-Amuah |
| 6,535,988 B1 | 3/2003 | Poisner |
| 6,557,104 B1 | 4/2003 | Vu et al. |
| 6,560,627 B1 | 5/2003 | McDonald et al. |
| 6,609,199 B1 | 8/2003 | DeTreville |
| 6,615,278 B1 | 9/2003 | Curtis |
| 6,633,963 B1 | 10/2003 | Ellison et al. |
| 6,633,981 B1 | 10/2003 | Davis |
| 6,651,171 B1 | 11/2003 | England et al. |
| 6,678,825 B1 | 1/2004 | Ellison et al. |
| 6,684,326 B1 | 1/2004 | Cromer et al. |
| 2001/0021969 A1 | 9/2001 | Burger et al. |
| 2001/0027511 A1 | 10/2001 | Wakabayashi et al. |
| 2001/0027527 A1 | 10/2001 | Khidekel et al. |
| 2001/0037450 A1 | 11/2001 | Metlitski et al. |
| 2002/0007456 A1 | 1/2002 | Peinado et al. |
| 2002/0023032 A1 | 2/2002 | Pearson et al. |
| 2002/0147916 A1 | 10/2002 | Strongin et al. |
| 2002/0166061 A1 | 11/2002 | Falik et al. |
| 2002/0169717 A1 | 11/2002 | Challener |
| 2003/0018892 A1 | 1/2003 | Tello |
| 2003/0074548 A1 | 4/2003 | Cromer et al. |
| 2003/0115453 A1 | 6/2003 | Grawrock |
| 2003/0126442 A1 | 7/2003 | Glew et al. |
| 2003/0126453 A1 | 7/2003 | Glew et al. |
| 2003/0159056 A1 | 8/2003 | Cromer et al. |
| 2003/0188179 A1 | 10/2003 | Challener et al. |
| 2003/0196085 A1 | 10/2003 | Lampson et al. |
| 2004/0117539 A1 | 6/2004 | Bennett et al. |

FOREIGN PATENT DOCUMENTS

| | | |
|---|---|---|
| EP | 0473913 | 3/1992 |
| EP | 0600112 A1 | 6/1994 |
| EP | 0602867 | 6/1994 |
| EP | 0892521 | 1/1999 |
| EP | 0930567 A3 | 7/1999 |
| EP | 0961193 | 12/1999 |
| EP | 0965902 | 12/1999 |
| EP | 1030237 A1 | 8/2000 |
| EP | 1055989 | 11/2000 |
| EP | 1056014 | 11/2000 |
| EP | 1085396 | 3/2001 |
| EP | 1146715 A1 | 10/2001 |
| EP | 1209563 | 5/2002 |
| EP | 1271277 | 1/2003 |
| JP | 76139 A | 3/2000 |
| JP | 76139 A | 3/2000 |
| WO | WO9524696 | 9/1995 |
| WO | WO 97/29567 A1 | 8/1997 |
| WO | WO9812620 | 3/1998 |
| WO | WO 98/34365 | 8/1998 |
| WO | WO 98/44402 | 10/1998 |
| WO | WO 99/05600 | 2/1999 |
| WO | WO 99/09482 | 2/1999 |
| WO | WO9918511 | 4/1999 |
| WO | WO 99/57863 | 11/1999 |
| WO | WO9965579 | 12/1999 |
| WO | WO0021238 | 4/2000 |
| WO | WO 00/62232 | 10/2000 |
| WO | WO 01/27723 A2 | 4/2001 |
| WO | WO 01/27821 A2 | 4/2001 |
| WO | WO0163994 | 8/2001 |
| WO | WO 01/75564 | 10/2001 |
| WO | WO 01/75565 A2 | 10/2001 |
| WO | WO 01/75595 A2 | 10/2001 |
| WO | WO0201794 | 1/2002 |
| WO | WO 02/17555 | 2/2002 |
| WO | WO02060121 | 8/2002 |
| WO | WO 02/086684 | 10/2002 |
| WO | WO03058412 | 7/2003 |

OTHER PUBLICATIONS

Berg, Cliff, "How Do I Create A Signed Applet?" Dr. Dobb's Journal, Aug. 1997, pp. 1-9.

Goldberg, Robert P., "Survey of Virtual Machine Research," IEEE Computer Magazine vol. 7, No. 6, pp. 34-45, 1974.

Gong, Li, et al., "Going Beyond the Sandbox: An Overview of the New Security Architecture in the Java Development Kit 1.2," JavaSoft, Sun Microsystems, Inc., Proceedings of the USENIX Symposium on Internet Technologies and Systems, Monterey, California, 11 pages Dec. 1997.

Gum, P.H., "System/370 Extended Architecture: Facilities for Virtual Machines," IBM J. Research Development, vol. 27, No. 6, pp. 530-544, Nov. 1983.

Heinrich, J., "MIPS R4000 Microprocessor User's Manual," Chapter 4, Memory Management, pp. 61-97, 1993.

Heinrich, J., "MIPS R4000 Microprocessor User's Manual," Second Edition, Chapter 4: Memory Management, pp. 67-79, 1994.

Intel Corporation, Intel386™ DX Microprocessor, 32-Bit CHMOS Microprocessor With Integrated Memory Management, 56 pages, Dec. 1995.

Lawton, K., "Running Multiple Operation Systems Concurrently On An IA32 PC Using Virtualization Techniques," http://www.plex86.org/research/paper.txt., pp. 1-31, downloaded Aug. 9, 2001.

Motorola, M68040 User's Manual (Including the MC68040, MC68040V, MC68LC040, MC68EC040, and MC68EC040V), Revised 1993.

Rosenblum, M., "VMware's Virtual Platform™ A Virtual Machine Monitor for Commodity PCs," Proceedings of the 11th Hotchips Conference, Stanford University Palo Alto, California, pp. 185-196, Aug. 1999.

Trusted Computing Platform Alliance (TCPA), Main Specification Version 1.1a, 321 pages, Copyright 2000-2001.

IBM Technical Disclosure Bulletin, "Information Display Technique For A Terminate Stay Resident Program," vol. 34, Issue No. 7A, pp. 156-158, Dec. 1, 1991.

Chien, Andrew A., et al., "Safe and Protected Execution for the Morph/AMRM Reconfigurable Processor," 7th Annual IEEE Symposium, FCCM '99 Proceedings Apr. 21, 1999, pp. 209-221, XP010359180, ISBN: 0-7695-0375-6, Los Alamitos, CA.

Karger, Paul A., et al., "A VMM Security Kernel for the VAX Architecture," Proceedings of the Symposium on Research in Security and Privacy, May 7, 1990, pp. 2-19, XP010020182, ISBN: 0-8186-2060-9, Boxborough, MA.

Kashiwagi, Kazuhiko, et al., "Design and Implementation of Dynamically Reconstructing System Software," Software Engineering Conference, 1996 Asia Pacific Seoul, South Korea, IEEE Comput. Soc. Dec. 4, 1996, pp. 278-287.

PCT Search Report dated Jul. 29, 2003 (U.S. Patent No. '075 Previously cited).

PCT Search Report dated Jul. 22, 2003.

Robin, John Scott and Irvine, Cynthia E., "Analysis of the Pentium's Ability to Support a Secure Virtual Machine Monitor," Proceedings of the 9th USENIX Security Symposium, Aug. 14, 2000, pp. 1-17, XP002247347, Denver, CO.

Brands, Stefan, "Restrictive Blinding of Secret-Key Certificates", *Springer-Verlag* XP002201306, (1995),Chapter 3.

Davida, George I., et al., "Defending Systems Against Viruses through Cryptographic Authentication", *Proceedings of the Symposium on Security and Privacy*, IEEE Comp. Soc. Press, ISBN 0-8186-1939-2,(May 1989).

Intel, "IA-32 Intel Architecture Software Developer's Manual", vol. 3: *System Programming Guide*, Intel Corporation—2003, 13-1 through 13-24.

Luke, Jahn, et al., "Replacement Strategy for Aging Avionics Computers", *IEEE AES Systems Magazine*, XP002190614,(Mar. 1999).

Menezes, Oorschot, "Handbook of Applied Cryptography", *CRC Press LLC*, USA XP002201307, (1997),475.

Saez, Sergio, et al., "A Hardware Scheduler for Complex Real-Time Systems", *Proceedings of the IEEE International Symposium on Industrial Electronics*, XP002190615,(Jul. 1999),43-48.

Sherwood, Timothy, et al., "Patchable Instruction ROM Architecture", *Department of Computer Science and Engineering, University of California, San Diego*, La Jolla, CA, (Nov. 2001).

Coulouris, George, et al., "Distributed Systems, Concepts and Designs", *2nd Edition*, (1994),422-424.

Crawford, John, "Architecture of the Intel 80386", *Proceedings of the IEEE International Conference on Computer Design: VLSI in Computers and Processors (ICCD '86)*, (Oct. 6, 1986),155-160.

Fabry, R.S., "Capability-Based Addressing", Fabry, R.S., "Capability-Based Addressing," *Communications of the ACM*, vol. 17, No. 7, (Jul. 1974),403-412.

Frieder, Gideon, "The Architecture And Operational Characteristics of the VMX Host Machine", The Architecture And Operational Characteristics of the VMX Host Machine, *IEEE*, (1982),9-16.

HP Mobile Security Overview, "HP Mobile Security Overview", (Sep. 2002),1-10.

IBM Corporation, "IBM ThinkPad T30 Notebooks", *IBM Product Specification*, located at www-1.ibm.com/services/files/cisco_t30_spec_sheet_070202.pdf, last visited Jun. 23, 2004,(Jul. 2, 2002),1-6.

Intel Corporation, "IA-64 System Abstraction Layer Specification", *Intel Product Specification*, Order No. 245359-001, (Jan. 2000),1-112.

Intel Corporation, "Intel 82802AB/82802AC Firmware Hub (FWH)", *Intel Product Datasheet*, Document No. 290658-004,(Nov. 2000),1-6, 17-28.

Intel Corporation, "Intel IA-64 Architecture Software Developer's Manual", vol. 2: *IA-64 System Architecture*, Order No. 245318-001, (Jan. 2000),i, ii, 5.1-5.3, 11.1-11.8, 11.23-11.26.

Menezes, Alfred J., et al., "Handbook of Applied Cryptography", *CRC Press Series on Discrete Mathematices and its Applications*, Boca Raton, FL, XP002165287, ISBN 0849385237,(Oct. 1996),403-405, 506-515, 570.

Nanba, S., et al., "VM/4: ACOS-4 Virtual Machine Architecture", VM/4: ACOS-4 Virtual Machine Architecture, *IEEE*, (1985),171-178.

RSA SECURITY, "Hardware Authenticators", www.rsasecurity.com/node.asp?id=1158, 1-2.

RSA SECURITY, "RSA SecurID Authenticators", www.rsasecurity.com/products/securid/datasheets/SID_DS_0103.pdf, 1-2.

RSA SECURITY, "Software Authenticators", www.srasecurity.com/node.asp?id=1313, 1-2.

Schneier, Bruce, "Applied Cryptography: Protocols, Algorithm, and Source Code in C", *Wiley, John & Sons, Inc.*, XP002939871; ISBN 0471117099,(Oct. 1995),47-52.

Schneier, Bruce, "Applied Cryptography: Protocols, Algorithm, and Source Code in C", *Wiley, John & Sons, Inc.*, XP002138607; ISBN 0471117099,(Oct. 1995),56-65.

Schneier, Bruce, "Applied Cryptography: Protocols, Algorithms, and Source Code in C", *Wiley, John & Sons, Inc.*, XP0021111449; ISBN 0471117099,(Oct. 1995),169-187.

Schneier, Bruce, "Applied Cryptography: Protocols, Algorithms, and Source Code in C", 2nd Edition; *Wiley, John & Sons, Inc.*, XP002251738; ISBN 0471128457,(Nov. 1995),28-33; 176-177; 216-217; 461-473; 518-522.

Richt, Stefan, et al., "In-Circuit-Emulator Wird Echtzeittauglich", *Elektronic*, Franzis Verlag GMBH, Munchen, DE, vol. 40, No. 16, XP000259620,(100-103),Aug. 6, 1991.

* cited by examiner

RECLAIMING EXISTING FIELDS IN ADDRESS TRANSLATION DATA STRUCTURES TO EXTEND CONTROL OVER MEMORY ACCESSES

BACKGROUND OF THE INVENTION

A computer processor accesses system memory to retrieve or store data within the system memory. Specifically, the processor uses the physical address of data in the memory to identify and access the data. However, the physical address where data is stored in the memory is not the address that the processor uses to index the data during internal manipulations. Rather, the processor assigns a virtual address to data being processed according to program instructions. Thus, memory accesses often require the translation of virtual addresses into physical addresses.

A conventional address translation mechanism is typically based on a translation lookaside buffer (TLB), an in-processor structure that acts as a cache for previously processed address translations. For example, in the processor instruction set architecture (ISA) of the 32-bit Intel® architecture (referred to herein as the IA-32 ISA), address translation is controlled by a TLB and a page-table hierarchy. The page-table hierarchy, which is referenced by the processor's control register CR3, is a translation data structure used to translate a virtual memory address (also referred to as a linear memory address in the context of the IA-32 ISA) into a physical memory address when paging is enabled. A page-table hierarchy includes a page directory (PD), a set of page tables (PTs), and multiple page frames (PFs). Typically, translation of a virtual memory address into a physical memory address begins with searching the TLB using either the upper 20 bits (for a 4 KB page) or the upper 10 bits (for a 4 MB page) of the virtual address. If a match is found, the upper bits of a physical page frame that are contained in the TLB are conjoined with the lower bits of the virtual address to form a physical address. If no match is found, the processor consults the page table hierarchy to determine the virtual-to-physical translation, which is then cached in the TLB.

Each entry in the PD and PTs typically includes various fields that control the accessibility of memory pages. Examples of such fields include the present (P) flag indicating whether or not the page referenced by the entry is valid, the user/supervisor (U/S) flag controlling accesses to the page referenced by the entry based on privilege level, and the read/write (R/W) flag controlling accesses based on access type (i.e., read or write)

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EMBODIMENTS

Figure 1:
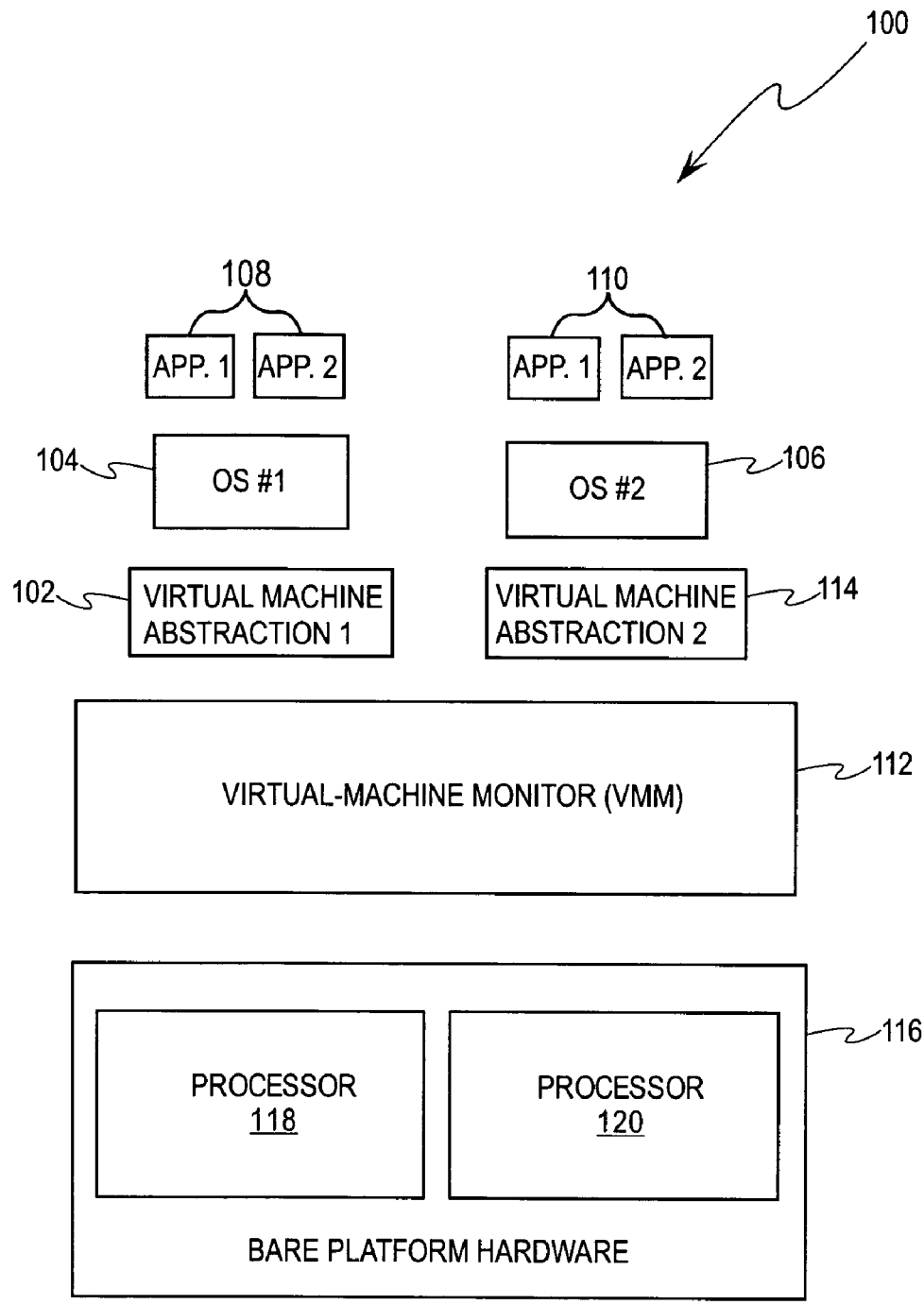
FIG. 1 illustrates one embodiment of a virtual-machine environment, in which the present invention may operate.

A method and apparatus for reclaiming existing bits in an address translation data structure to extend control over memory accesses in a virtual machine environment are described. In the following description, for purposes of explanation, numerous specific details are set forth in order to provide a thorough understanding of the present invention. It will be apparent, however, to one skilled in the art that the present invention can be practiced without these specific details.

Some portions of the detailed descriptions that follow are presented in terms of algorithms and symbolic representations of operations on data bits within a computer system's registers or memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or the like, may refer to the action and processes of a computer system, or similar electronic computing device, that manipulates and transforms data represented as physical (electronic) quantities within the computer system's registers and memories into other data similarly represented as physical quantities within the computer-system memories or registers or other such information storage, transmission or display devices.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

FIG. 1 illustrates one embodiment of a virtual-machine environment 100, in which the present invention may operate. In this embodiment, bare platform hardware 116 comprises a computing platform, which may be capable, for example, of executing a standard operating system (OS) or a virtual-machine monitor (VMM), such as a VMM 112. The VMM 112, though typically implemented in software, may emulate and export a bare machine interface to higher level software. Such higher level software may comprise a standard or real-time OS, may be a highly stripped down operating environment with limited operating system functionality, or may not include traditional OS facilities. Alternatively, for example, the VMM 112 may be run within, or on top of, another VMM. VMMs and their typical features and functionality are well known by those skilled in the art and may be implemented, for example, in software, firmware or by a combination of various techniques.

The platform hardware 116 includes a processor 118 and memory 120. Processor 118 can be any type of processor capable of executing software, such as a microprocessor, digital signal processor, microcontroller, or the like. Memory 120 can be a hard disk, a floppy disk, random access memory (RAM), read only memory (ROM), flash memory, any combination of the above devices, or any other type of machine medium readable by processor 118. Memory 120 may store instructions for performing the execution of method embodiments of the present invention.

The platform hardware 116 can be of a personal computer (PC), mainframe, handheld device, portable computer, set-top box, or any other computing system.

The VMM 112 presents to other software (i.e., "guest" software) the abstraction of one or more virtual machines (VMs), which may provide the same or different abstractions to the various guests. FIG. 1 shows two VMs, 102 and 114. The guest software running on each VM may include a guest OS such as a guest OS 104 or 106 and various guest software applications 108 and 110. The guest OSs 104 and 106 expect to access physical resources (e.g., processor registers, memory and I/O devices) within the VMs 102 and 114 on which the guest OS 104 or 106 is running and to perform other functions. For example, during address-translation operations, the guest OS expects to allocate physical memory, provide protection from and between software applications (e.g., applications 108 or 110), use a variety of paging techniques, etc. However, in a virtual-machine environment, the processor 118 and the VMM 112 need to have ultimate control over address-translation operations to support proper operation of VMs 102 and 114 and provide protection from and between VMs 102 and 114. In one embodiment, an address translation system referred to herein as a virtual translation lookaside buffer (TLB) system is provided that tolerates and supports the OS's attempts to control address translation while allowing the processor 118 and the VMM 112 to retain ultimate control over address-translation operations. Some embodiments of a virtual TLB system will be described in more detail below.

The resources that can be accessed by the guest software may either be classified as "privileged" or "non-privileged." For privileged resources, the VMM 112 facilitates functionality desired by guest software while retaining ultimate control over these privileged resources. Non-privileged resources do not need to be controlled by the VMM 112 and can be accessed by guest software.

In one embodiment, if guest software attempts to access a privileged resource, control is transferred to the VMM 112. In response, the VMM 112 either permits the guest software to access the privileged resource or emulates the functionality desired by the guest software, and then transfers control back to the guest software. In one embodiment, the transfer of control between the VM 102 or 114 and the VMM 112 is achieved by executing a special instruction. The control of guest software through this mechanism is referred to herein as VMX operation and the transfer of control from the guest software to the VMM is referred to herein as a VM exit. In another embodiment, the transfer of control between the VM 102 or 114 and the VMM 112 is initiated by non-instruction events, such as an asynchronous hardware interrupt or a page fault.

In one embodiment, when a VM exit occurs, components of the processor state used by guest software are saved, and components of the processor state required by the VMM 112 are loaded. This saving and loading of processor state may, depending on the processor instruction set architecture (ISA), have the effect of changing the active address space. For example, in the ISA of the 32-bit Intel® architecture (referred to herein as the IA-32 ISA), the active address space is determined by the values in the control registers, which may be saved and restored on VM exit.

In one embodiment, when a transition from the VMM 112 to guest software occurs, the processor state that was saved at the VM exit (and which may have been modified by the VMM 112) is restored and control is returned to the guest OS 104 or 106 or guest applications 108 or 110.

It should be noted that any other mechanism known in the art can be used to transfer control between the guest software and the VMM 112 without loss of generality.

Figure 2:
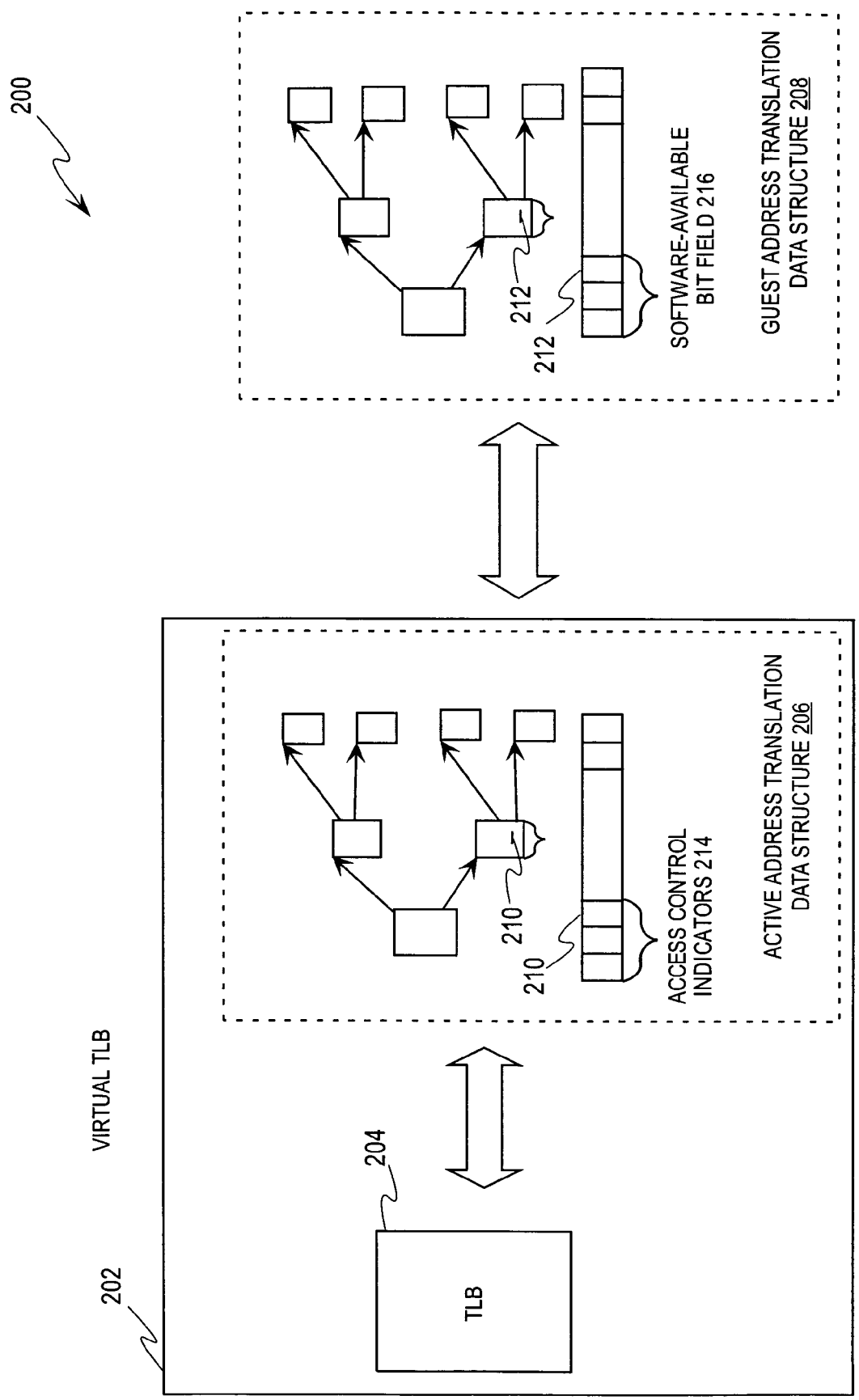
FIG. 2 is a block diagram of one embodiment of a virtual TLB system.

FIG. 2 is a block diagram of one embodiment of a virtual TLB system 200. The virtual TLB system 200 includes a guest address translation data structure 208 and a virtual TLB 202. The guest address translation data structure 208 indicates how the guest OS intends to translate virtual memory addresses to physical memory addresses. One example of such an address translation data structure is a page-table hierarchy used in the IA-32 ISA. However, various other address translation data structures may be used with the present invention without loss of generality. The guest address translation data structure 208 is managed by the guest OS, which can access and modify any entry in the guest address translation data structure 208. Some entries of the guest address translation data structure 208 include fields that are specifically designated for operational use by software. As shown in FIG. 2, an exemplary entry 212 in the guest address translation data structure 208 includes a software-available field 216 containing one or more bits that are designated for operational use by guest software (i.e., guest software may place values in this bit field for any desired purpose). It should be noted that the entries which include the software-available bit field and the number of bits in the software-available field contained in each entry may vary depending on the ISA. In the page-table hierarchy of the IA-32 ISA, for example, each entry in a page directory and page table includes three "AVAIL" bits that are architecturally guaranteed to be available for system programmer's use. As a result, these bits may not be used or interpreted by the hardware (e.g., to cause any special actions or protections).

The virtual TLB 202 includes a physical TLB 204 managed by the processor and an active address translation data structure 206 managed by the VMM. The active address translation data structure 206 and the guest address translation data structure 208 derive their formats from an architecturally defined format (e.g., the IA-32 format). The physical TLB 204 is loaded by the processor with address translations derived from the active address translation data structure 206.

In one embodiment, the VMM creates the active address translation data structure 206 based on the guest address translation data structure 208 and then periodically modifies one or more entries in the active address translation data structure 206 to conform to the corresponding entries in the guest address translation data structure 208. In one embodiment, the VMM modifies the active address translation data structure 206 upon receiving control over an event initiated by guest software and determining that the likely cause of the event is an inconsistency between the content of the active address translation data structure 206 and the content of the guest address translation data structure. Such event may be, for example, an attempt of the guest OS to manipulate the TLB 204 (e.g., a request of guest software to invalidate cached address translations in the TLB 204) or a page fault generated by the processor in response to an operation performed by guest software (e.g., a page fault generated in response to a request of guest software to write to a memory region that is marked as read-only in the active address translation data structure while being marked as writable in the guest address translation data structure).

When modifying the content of the active address translation data structure 206, the VMM refrains from copying software-available bit fields 216 from the guest address translation data structure 208 to the active address translation data structure 206 because the bit fields 216 are used internally by the guest software and have no meaning to the VMM. Accordingly, because a bit field 216 contained in an entry of the active address translation data structure 206 does not become overwritten with data from the guest address translation data structure 208, the VMM is able to reclaim this bit field for its own use. In one embodiment, the VMM uses a bit field within an entry (e.g., entry 210) of the active address translation data structure 206 to store access control indicators 214 that control accessibility of a memory region referenced by the entry 210. Examples of access control indicators and their usage in a virtual machine environment will be discussed in greater detail below.

Figure 3:
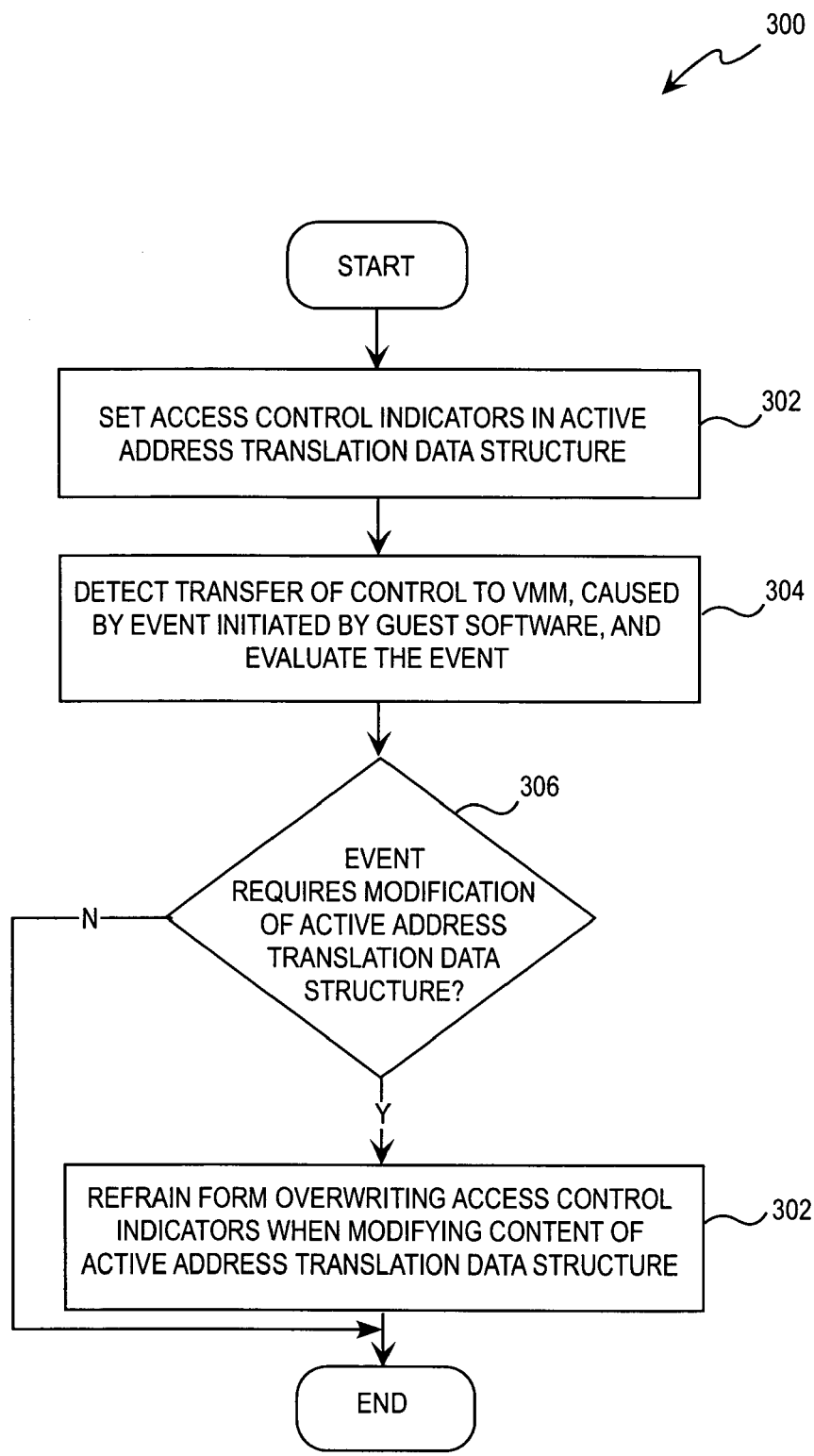
FIG. 3 is a flow diagram of one embodiment of a process for reclaiming existing fields of an address translation data structure to extend control over memory accesses in a virtual machine environment.

FIG. 3 is a flow diagram of one embodiment of a process 300 for reclaiming existing fields of an address translation data structure to extend control over memory accesses in a virtual machine environment. The process may be performed by processing logic that may comprise hardware (e.g., circuitry, dedicated logic, programmable logic, microcode, etc.), software (such as run on a general purpose computer system or a dedicated machine), or a combination of both.

Referring to FIG. 3, process 300 begins with processing logic setting access control indicators in one or more entries of an active address translation data structure (processing block 302). Processing logic sets access control indicators when creating an entry in the active address translation data structure. In one embodiment, an entry is created when processing logic creates the entire active address translation data structure based on a guest address translation data structure used by the guest OS for address translation operations. Alternatively, processing logic creates an entry in the active address translation data structure after a new entry is added to the guest address translation data structure. In one embodiment, once the access control indicators are set, processing logic can modify them as needed at any time.

Next, at processing block 304, processing logic detects transfer of control to the VMM which was caused by an event initiated by guest software (e.g., an attempt of guest software to manipulate the TLB or a page fault generated in response to an operation performed by guest software) and evaluates this event. Based on this evaluation, processing logic determines whether this event requires a modification of the active address translation data structure (decision box 306). This determination may, for example, depend on whether the page fault was generated because of the inconsistency between the content of the active address translation data structure and the content of the guest address translation data structure or for some other reason.

If the determination made at decision box 306 is negative, process 300 ends. Alternatively, if the determination made at decision box 306 is positive, processing logic refrains from overwriting the access control indicators while modifying the remaining content of the active address translation data structure to match the content of the guest address translation data structure (processing block 308). As a result, the access control indicators are maintained in the active address translation data structure for use by the processor during address translation operations.

Exemplary functionality of access control indicators will now be described with reference to specific features of the IA-32 ISA. However, it should be noted that the access control indicators may be used for various purposes other than those discussed below and with various processors other than IA-32 processors.

Figure 4:
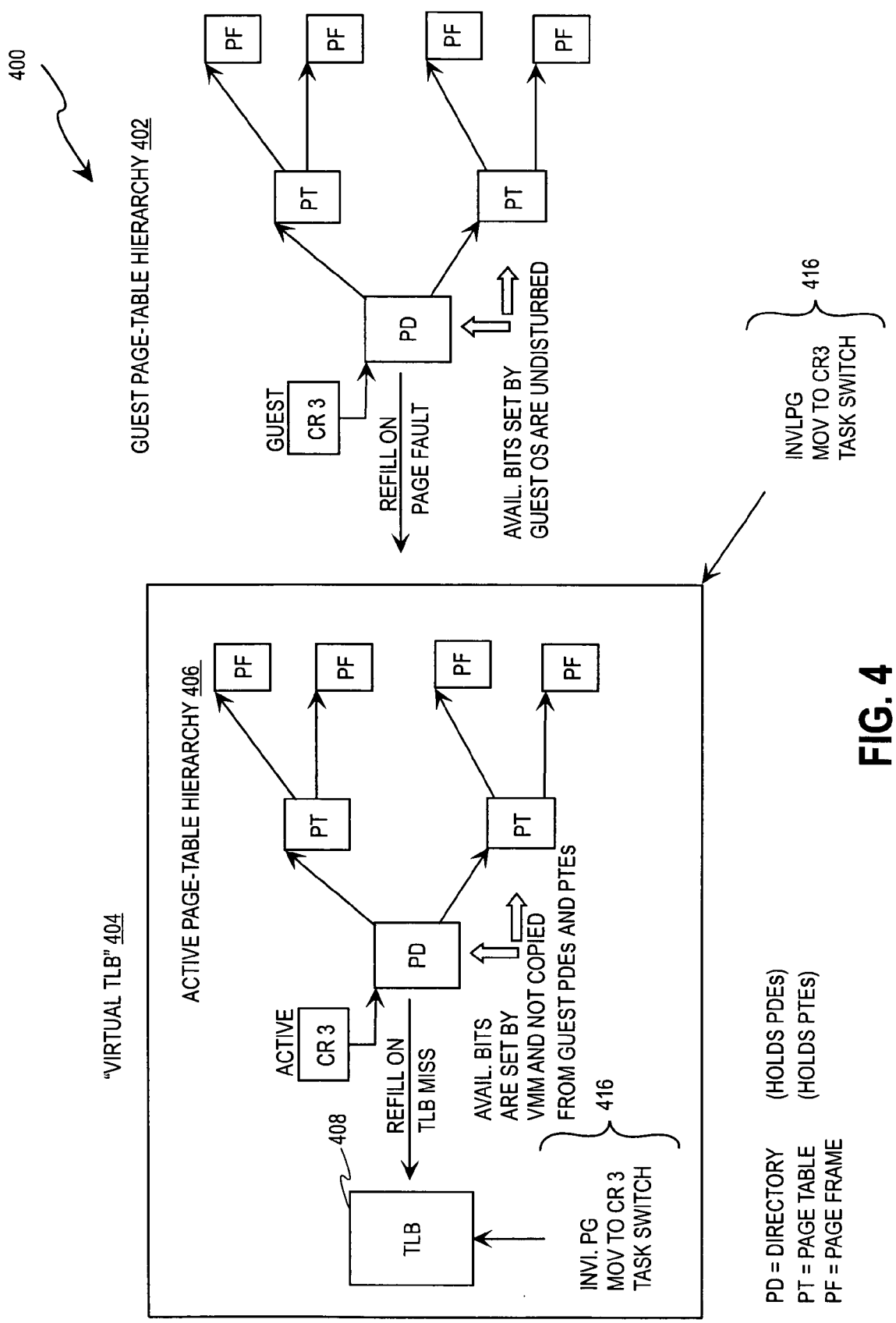
FIG. 4 is a block diagram of one embodiment of a virtual TLB system supporting address translation in the IA-32 ISA.

FIG. 4 is a block diagram of one embodiment of a virtual TLB system 400 supporting address translation in the IA-32 ISA. The system 400 includes a virtual TLB 404 containing an active translation data structure represented by an active page-table hierarchy 406 and a physical TLB 408. The system 400 also includes a guest translation data structure represented by a guest page-table hierarchy 402. The active page-table hierarchy 406 and the guest page-table hierarchy 402 derive their format from the IA-32 architecturally-defined format. The entries of the guest page-table hierarchy 402 have a conventional format according to the IA-32 ISA.

Figure 5:
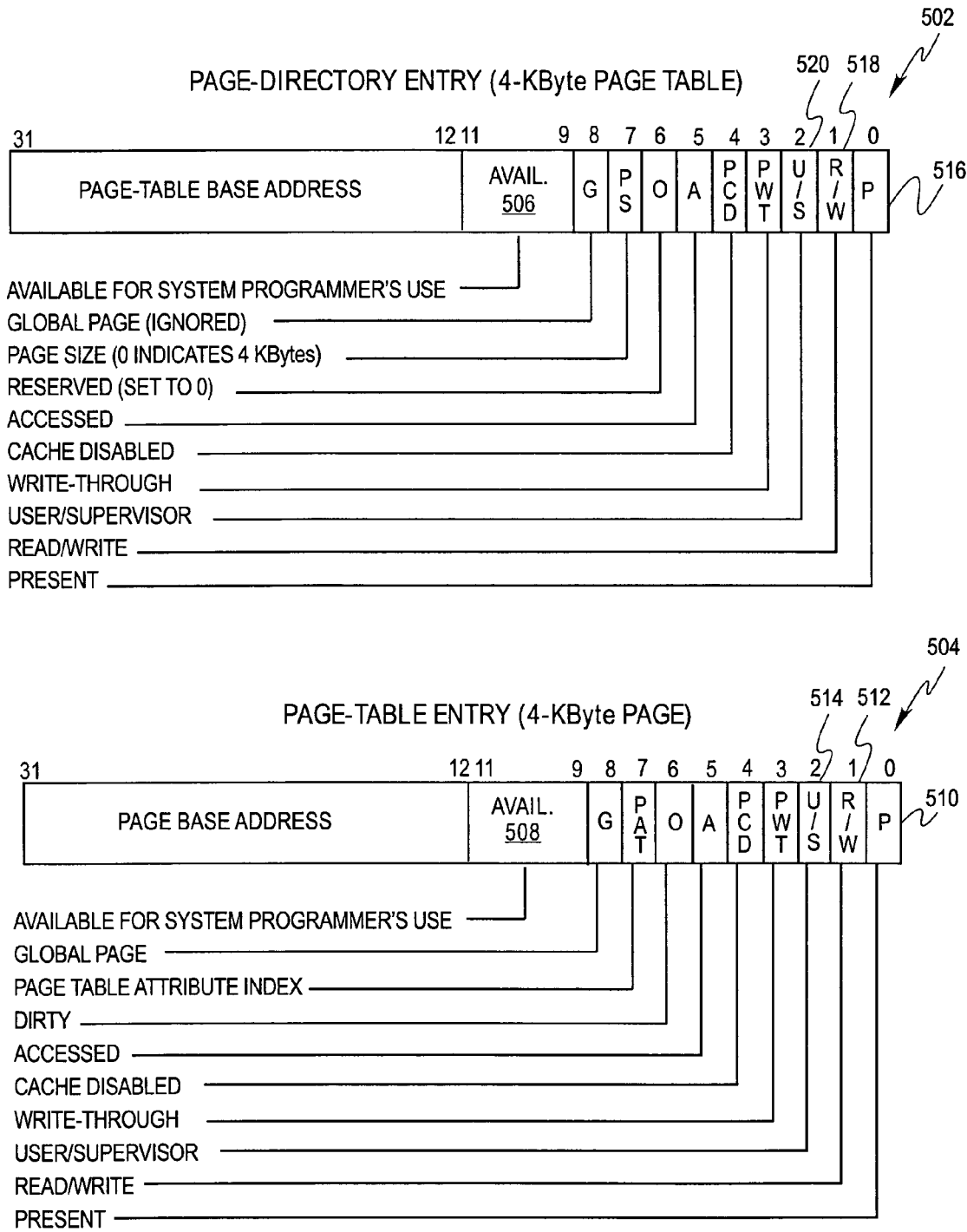
FIG. 5 illustrates the formats of page-directory entries (PDEs) and page-table entries (PTEs) in a conventional page-table hierarchy for the IA-32 ISA.

FIG. 5 illustrates the format 502 of page-directory entries (PDEs) and the format 504 of page-table entries (PTEs) in a conventional page-table hierarchy for the IA-32 ISA. Each PDE and PTE includes a set of bits that control the accessibility of memory pages. These bits include, for example, the present (P) flag 516 or 510 that indicates whether or not the page referenced by the entry is valid, the user/supervisor (U/S) flag 520 or 514 that controls accesses to the page referenced by the entry based on privilege level, and the read/write (R/W) flag 518 or 512 that controls accesses based on access type (i.e., read or write). Further, each PDE and PTE includes three "AVAIL" bits 506 and 508. AVAIL bits 506 and 508 are architecturally guaranteed to be available for use by system programmers. That is, software may place values in the AVAIL bits for any desired purpose (e.g., for recording information associated with a given page). As a result, hardware may not interpret or use these bits for any other purpose (e.g., new page-level protections). Thus, if these fields are not used by software, they become "wasted".

Returning to FIG. 4, the AVAIL bits in each PDE and PTE are set by the VMM and are not overwritten with data from the guest page-table hierarchy 402 when the content of the active page-table hierarchy 406 is modified. In one embodiment, the AVAIL bits are set when the active page-table hierarchy 406 is created or a new entry is added to the active page-table hierarchy 406.

In one embodiment, all entries in the active page-table hierarchy 406 are initially marked invalid (using P flag 516 in each PDE and P flag 510 in each PTE) to emulate the initialization state of the TLB when the TLB has no entries. Subsequently, when guest software presents a virtual address to the processor, the processor finds only invalid entries in the active page-table hierarchy 406, and a page fault is generated. The page fault transitions control from the guest OS to the VMM. The VMM then copies corresponding entries from the guest page-table hierarchy 402 to the active page-table hierarchy 406, refilling the active page-table hierarchy 406. During the refill, the AVAIL bits in the guest page-table hierarchy 402 are ignored (i.e., the AVAIL bits are not copied to the active page-table hierarchy 406).

Guest software is allowed to freely modify the guest page-table hierarchy 402 including changing virtual-to-physical mapping, permissions, etc. Accordingly, the active page-table hierarchy 406 may not be always consistent with the guest page-table hierarchy 402. That is, the active page-table hierarchy 406 may be out-of-date, e.g., it may allow too much access to its entries, provide wrong virtual-to-physical address mapping, etc. When a problem arises from an inconsistency between the hierarchies 402 and 406, the guest OS issues one of the instructions 416 to the physical TLB 408. These instructions result in the transfer of control from the guest OS to the VMM. The VMM will then determine the cause of the instruction and modify the content of the active page-table hierarchy 406 (e.g., remove the entries referred to by guest software in the issued instruction from the active page-table hierarchy 406). During the modification, the AVAIL bits in the guest page-table hierarchy 402 are not copied to the active page-table hierarchy 406.

Because the AVAIL bits in the active page-table hierarchy 406 remain unchanged, they can be reclaimed by the VMM. Once reclaimed, the AVAIL bits can be used in various ways. For example, one of the AVAIL bits may be a guest/host ("G/H") access bit that controls the access to the page by guest software. That is, the processor may permit access to the page referenced by the PTE only when the VMM (the "Host") is running if the "G/H" bit in an active PTE is clear. If the "G/H" bit is set, the processor may permit access to the page when either the VMM or the guest software is running.

The "G/H" bit can be used to resolve address space conflicts between the VMM and a guest OS. In the current IA-32 ISA, an address space conflict typically arises because existing processors (e.g., IA-32 microprocessors) do not allow the VMM to receive control over an event initiated by the guest OS (e.g., an attempt of the guest OS to access a privileged hardware resource) unless a portion of the VMM code and/or data structures is located in the same virtual address space as the guest OS. However, because the guest OS does not expect the VMM code and/or data structures to reside in the same address space, it can attempt to access a region occupied by the VMM in this address space, causing an address space conflict between the guest OS and the VMM. This conflict may result in abnormal termination of operations performed by the VMM or the guest OS.

The "G/H" bit prevents the occurrence of an address space conflict between the guest OS and the VMM. Specifically, with the "G/H" bit, the VMM finds a place in the guest OS's virtual address space to map its code and data structures and ensures that the corresponding "G/H" bit is cleared to protect the VMM code and data structures from accesses by the guest OS. When an attempt of the guest OS to access the address space occupied by the VMM is detected, the VMM code and data structures are remapped into an unused region within the guest OS's virtual address space, and the guest OS is able to access the desired address space.

The "G/H" bit can also be used to simplify address switches in the ISAs that do not require a portion of the VMM code and/or data structures to reside in the guest OS address space to receive control over an event initiated by the guest OS. For example, when the guest software is controlled by VMX operation, a VM exit causes a full address space switch to occur before transferring control to the VMM, hence no requirement to have a potion of the VMM code and/or data structures to reside in the guest OD address space. However, performing a full address switch for each VM exit is costly. Accordingly, the performance can be optimized by running a portion of the VMM code and/or data structures in the guest OS address space and use the "G/H" bit to protect the VMM code and data structures from accesses by the guest OS as discussed above.

In another example, two of the AVAIL bits may be interpreted by the processor as execute-privilege "X" and read-privilege "R" bits, while the existing "R/W" bit may be reinterpreted as a write-privilege "W" bit. As a result, different types of page accesses can be controlled independently. For example, the processor may prohibit execution of any instructions from the page when the X bit is clear and enable execution of instructions from the page when the X bit is set. Similarly, the "R" bit may control data read accesses from the page, and the "W" bit may control data write accesses to the page.

The combination of independently settable "R", "W" and "X" bits may be beneficial for use with dynamic binary translators, which modify instruction binaries for various purposes, such as instruction-set emulation, address tracing, etc. For example, the combination of the "R", "W" and "X" bits may simplify handling of self-modifying code (SMC) and self-examining code (SEC) by a dynamic binary translator on IA-32 processors. That is, a dynamic binary translator can set the combination of the "R", "W" and "X" bits to 001 on a page that holds translated instructions, thus allowing the execution of the code by the processor while detecting the code's attempts to modify or read the code's instruction bytes (which may differ from the original instructions of the code due to the translation or patching actions of the binary translator). For pages that hold a mixture of instructions and data, a binary translator can set the "R" and "W" bits as appropriate, but keep the "X" bit set to 0 so that the code can directly access data on the page but will not be able to execute instructions on the page. An attempt to execute instructions on the page will cause a transition to the VMM which can then emulate the faulting instructions.

The combination of "R", "W" and "X" bits may also allow secure execution of code containing an embedded secret key or algorithm. That is, the VMM may map the code containing an embedded secret key or algorithm onto a page that is referenced by an entry with the combination of "R", "W" and "X" bits set to 001. As a result, the secure code can be invoked and executed, and at the same time, the embedded secret key or algorithm will be protected from being read or modified by other code running in the same address space.

The combination of "R", "W" and "X" bits may further be used to assist debugging operations. Specifically, present pages holding data may be mapped either with the combination of "R", "W" and "X" bits set to 010 or 110 by a VMM-resident debugger. With these protections, the debugger can immediately determine when problematic code has inadvertently started to execute data as if it were instructions.

In yet another example, one of the AVAIL bits may be combined with the existing "U/S" bit to indicate whether a given page is accessible by code running at a certain privilege level. The VMM can then use two bits to specify the highest privilege level at which a given page is accessible. For example, the value of 00 may indicate that only the code running at privilege level 0 may access a given page, the value of 01 may indicate that the code running at privilege level 0 or 1 may access the page, the value of 10 may indicate that the code running at privilege level 0, 1 or 2 may access the page, and the value of 11 may indicate that the code running at any privilege level may access the page. The use of two bits to control the privilege level of the accessing code provides higher degree of flexibility, making it possible, for example, to run device drivers at privilege level 1 and the rest of the OS kernel at privilege level 0, while using page-level protections to guard the ring-0 kernel against rogue or faulty ring-1 device drivers. These page level protections are not possible with the existing "U/S" bit, which clusters rings 0, 1, 2 together as the supervisor (S) privilege level, and designates ring 3 as the user (U) privilege level.

The functionalities described above with reference to the "G/H" bit, the independently settable "R", "W" and "X" bits and the combination of the "U/S" bit with one AVAIL bit can be achieved simultaneously by redefining the meanings of the 3 existing "P", "R/W" and "U/S" bits and combining them with the 3 reclaimed AVAIL bits. Specifically, three of the resulting six bits may be used as independently settable "R", "W" and "X" bits, two of the remaining three bits may be used to indicate the highest ring at which the code has access rights, and the last bit can be used as a "G/H" bit. For this interpretation of the bits, the page may be considered "not present" if the combination of the "R", "W", and "X" bits has a setting of 000.

It should be noted that the existing fields within the active address translation data structures can be interpreted and used in a variety of ways other than those described above without loss of generality.

Thus, a method and apparatus for reclaiming existing fields in an address translation data structure have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   determining that a modification of content of an active address translation data structure is required; and
   modifying an entry in the active address translation data structure to conform to a corresponding entry in a guest address translation data structure; and
   keeping a portion of the entry in the active address translation data structure unchanged while modifying the entry in the active address translation data structure, the unchanged portion of the entry in the active address translation data structure including at least one access control indicator and corresponding to a field designated for operational use by guest software within the entry of the guest address translation data structure.

2. The method of claim 1 wherein the content of the active address translation data structure is used by a processor to cache address translations in a translation-lookaside buffer (TLB).

3. The method of claim 1 wherein the guest address translation data structure is used by guest software for address translation operations.

4. The method of claim 1 wherein the active address translation data structure is managed by a virtual machine monitor (VMM).

5. The method of claim 1 further comprising:
   setting the at least one access control indicator to a specific value.

6. The method of claim 1 wherein the active address translation data structure is an active page-table hierarchy.

7. The method of claim 6 wherein:
   the entry in the active address translation data structure is any one of a page-table entry and a page-directory entry; and
   the at least one access control indicator is at least one software-available bit within the entry.

8. The method of claim 6 wherein the at least one access control indicator includes a guest-host indicator controlling access to a corresponding page in the page-table hierarchy by guest software.

9. The method of claim 6 wherein the at least one access control indicator includes an execute-privilege indicator controlling execution of instructions from a corresponding page in the page-table hierarchy and a read-privilege indicator controlling read accesses to the corresponding page in the page-table hierarchy.

10. The method of claim 9 wherein a read/write bit is re-interpreted as a write privilege indicator controlling write accesses to the corresponding page in the page-table hierarchy.

11. The method of claim 6 wherein the at least one access control indicator includes a privilege-level access indicator controlling accesses to a corresponding page in the page-table hierarchy by code running at a specific privilege level.

12. An apparatus comprising:
   a guest address translation data structure to translate virtual memory addresses into physical memory addresses by guest software;
   an active address translation data structure to derive partial content from the guest address translation data structure, the partial content excluding a field designated for operational use by guest software within each of a plurality of entries in the guest address translation data structure, the designated field remaining unchanged when a corresponding entry in the active address translation data structure is modified to conform to content of the guest address translation data structure; and
   a translation-look aside buffer (TLB) to store address translations obtained from the active address translation data structure by a processor.

13. The apparatus of claim 12 wherein the active address translation data structure is managed by a virtual machine monitor (VMM).

14. The apparatus of claim 13 wherein the VMM is to set at least one access control indicator in an entry of the active address translation data structure to a specific value, the at least one access control indicator corresponding to a field designated for operational use by the guest software within a relevant entry of the guest address translation data structure.

15. The apparatus of claim 12 wherein the active address translation data structure is an active page-table hierarchy.

16. The apparatus of claim 15 wherein:
   the entry in the active address translation data structure is any one of a page-table entry and a page-directory entry; and
   the at least one access control indicator is at least one software-available bit within the entry.

17. The apparatus of claim 15 wherein the at least one access control indicator in the entry of the active address translation data structure includes a guest-host indicator controlling access to a corresponding page in the page-table hierarchy by guest software.

18. The apparatus of claim 15 wherein the at least one access control indicator in the entry of the active address translation data structure includes an execute-privilege indicator controlling execution of instructions from a corresponding page in the page-table hierarchy and a read-privilege indicator controlling read accesses to the corresponding page in the page-table hierarchy.

19. The apparatus of claim 18 wherein a read/write bit is re-interpreted as a write privilege indicator controlling write accesses to the corresponding page in the page-table hierarchy.

20. The apparatus of claim 15 wherein the at least one access control indicator in the entry of the active address translation data structure includes a privilege-level access indicator controlling accesses to a corresponding page in the page-table hierarchy by code running at a specific privilege level.

21. A machine-readable medium containing instructions which, when executed by a processing system, cause the processing system to perform a method, the method comprising:
determining that a modification of content of an active address translation data structure is required; and
modifying an entry in the active address translation data structure to conform to a corresponding entry in a guest address translation data; and
keeping a portion of the entry in the active address translation data structure unchanged while modifying the entry in the active address translation data structure, the unchanged portion of the entry in the active address translation data structure including at least one access control indicator and corresponding to a field designated for operational use by guest software within the entry of the guest address translation data structure.

22. The machine-readable medium of claim 21 wherein the content of the active address translation data structure is used by a processor to cache address translations in a translation-lookaside buffer (TLB).

23. The machine-readable medium of claim 21 wherein the guest address translation data structure is used by guest software for address translation operations.

24. The machine-readable medium of claim 21 wherein the active address translation data structure is managed by a virtual machine monitor (VMM).

25. The machine-readable medium of claim 21 wherein the active address translation data structure is an active page-table hierarchy.

26. The machine-readable medium of claim 25 wherein:
the entry in the active address translation data structure is any one of a page-table entry and a page-directory entry; and
the at least one access control indicator is at least one software-available bit within the entry.

27. A system comprising:
a processing system; and
a memory, coupled to the processing system, to store instructions, which when executed by the processing system, cause the processing system to determine that a modification of content of an active address translation data structure is required, to modify an entry in the active address translation data structure to conform to a corresponding entry in a guest address translation data structure, and to keep a portion of the entry in the active address translation data structure unchanged while modifying the entry in the active address translation data structure, the unchanged portion of the entry in the active address translation data structure including at least one access control indicator and corresponding to a field designated for operational use by guest software within the entry of the guest address translation data structure.

28. The system of claim 27 wherein the content of the active address translation data structure is used by a processor to cache address translations in a translation-lookaside buffer (TLB).

29. The system of claim 27 wherein the guest address translation data structure is used by guest software for address translation operations.

30. The system of claim 29 wherein the active address translation data structure is managed by a virtual machine monitor (VMM).

* * * * *